J. L. SIMMONS.
VALVE CONTROL MECHANISM FOR GAS ENGINES.
APPLICATION FILED MAY 19, 1911.
1,120,553.
Patented Dec. 8, 1914.
3 SHEETS—SHEET 3.
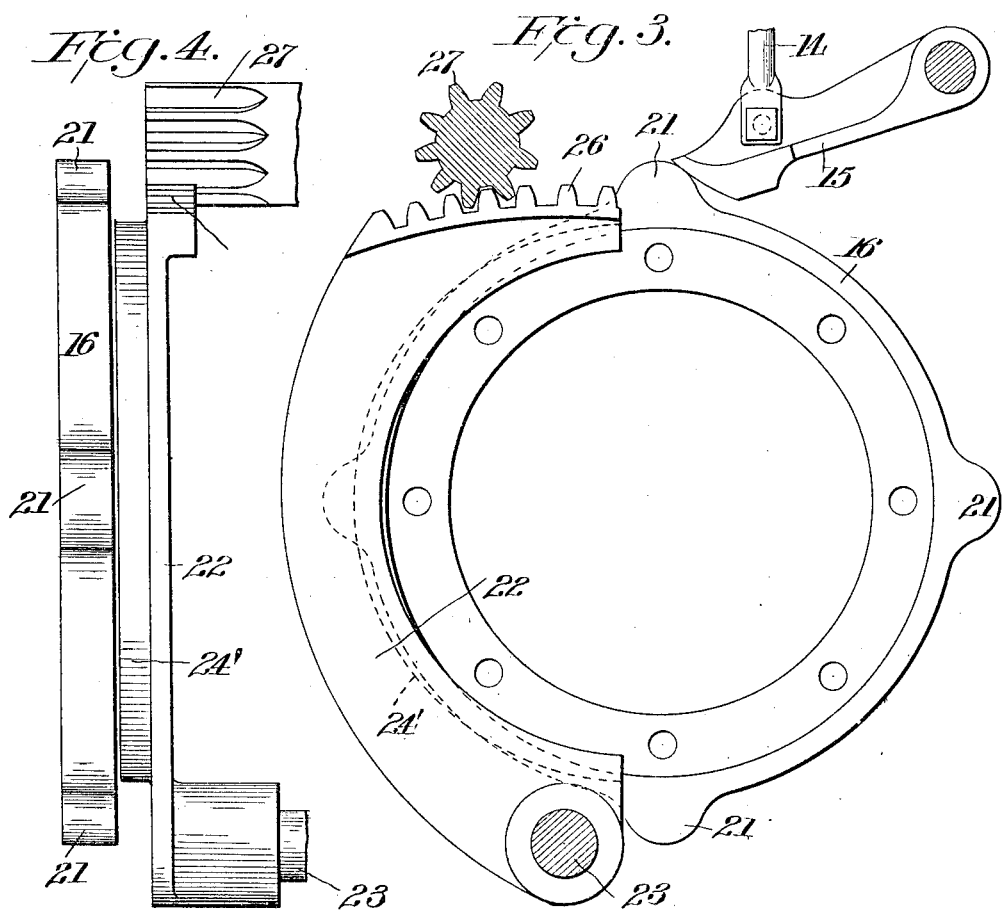
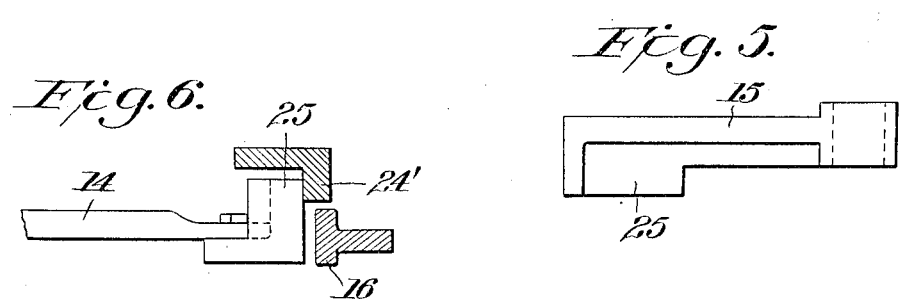
WITNESSES
Grace P. Brereton
Mary H. Farr
INVENTOR
James Lee Simmons
By Sturtevant & Mason
Attorneys

UNITED STATES PATENT OFFICE.

JAMES LEE SIMMONS, OF WASHINGTON, DISTRICT OF COLUMBIA, ASSIGNOR TO GYRO MOTOR COMPANY, OF WASHINGTON, DISTRICT OF COLUMBIA, A CORPORATION OF THE DISTRICT OF COLUMBIA.

VALVE-CONTROL MECHANISM FOR GAS-ENGINES.

1,120,553.         Specification of Letters Patent.     Patented Dec. 8, 1914.

Application filed May 19, 1911. Serial No. 628,339.

*To all whom it may concern:*

Be it known that I, JAMES LEE SIMMONS, a citizen of the United States, residing at Washington, in the District of Columbia, have invented certain new and useful Improvements in Valve-Control Mechanism for Gas-Engines, of which the following is a description, reference being had to the accompanying drawing, and to the letters and figures of reference marked thereon.

The invention relates to new and useful improvements in rotary gas engines, and more especially to gas engines of the type wherein a plurality of cylinders are carried by a rotating casing, and wherein a piston in each cylinder coöperates with a stationary crank to rotate the casing and cylinders.

An object of the invention is to provide devices for relieving the compression in the cylinders, so that the amount of compression and speed of the engine, may be regulated, the main purpose of which is to aid in the cranking and starting of the engine.

Figure 1:
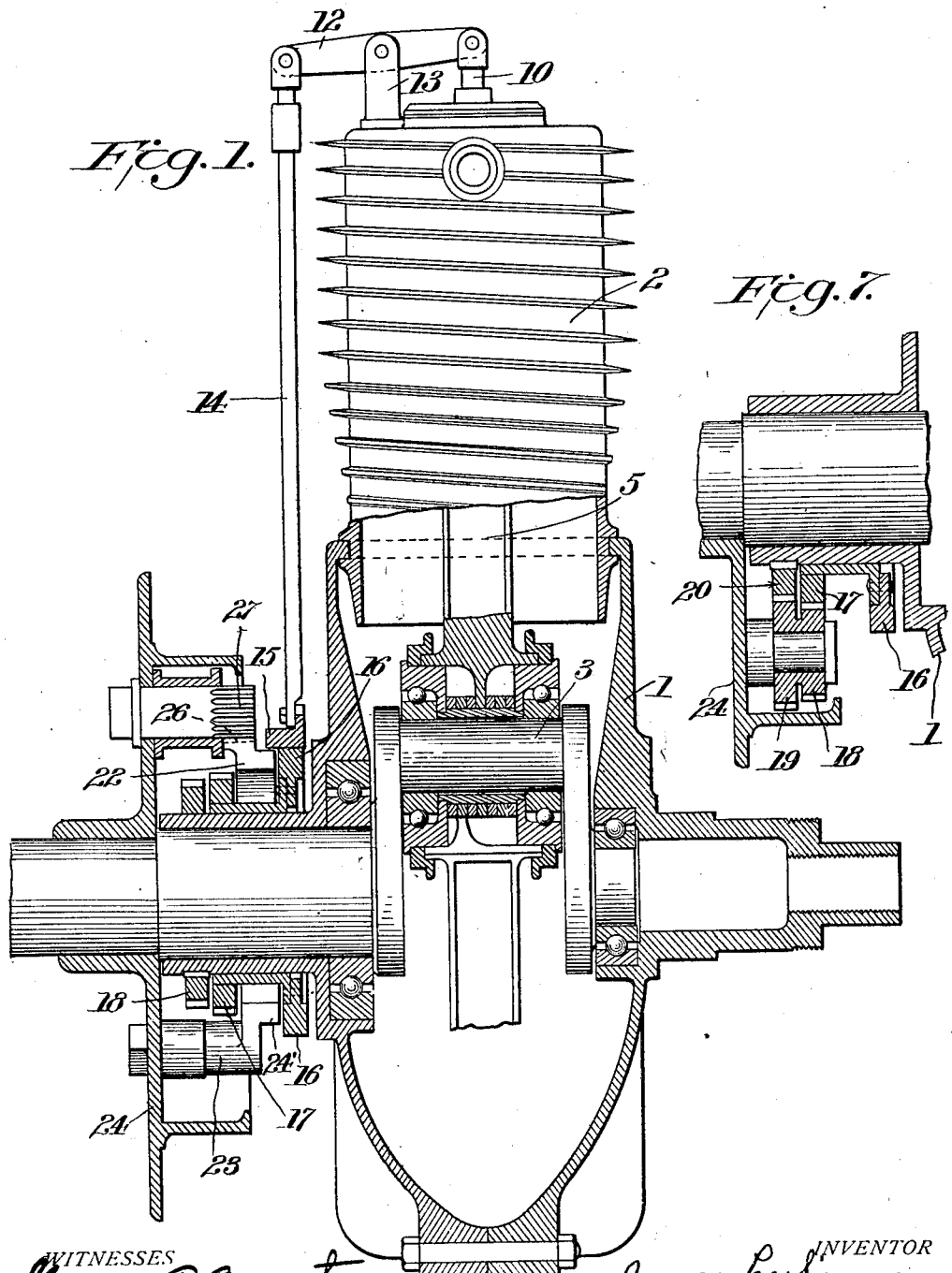
Figure 2:
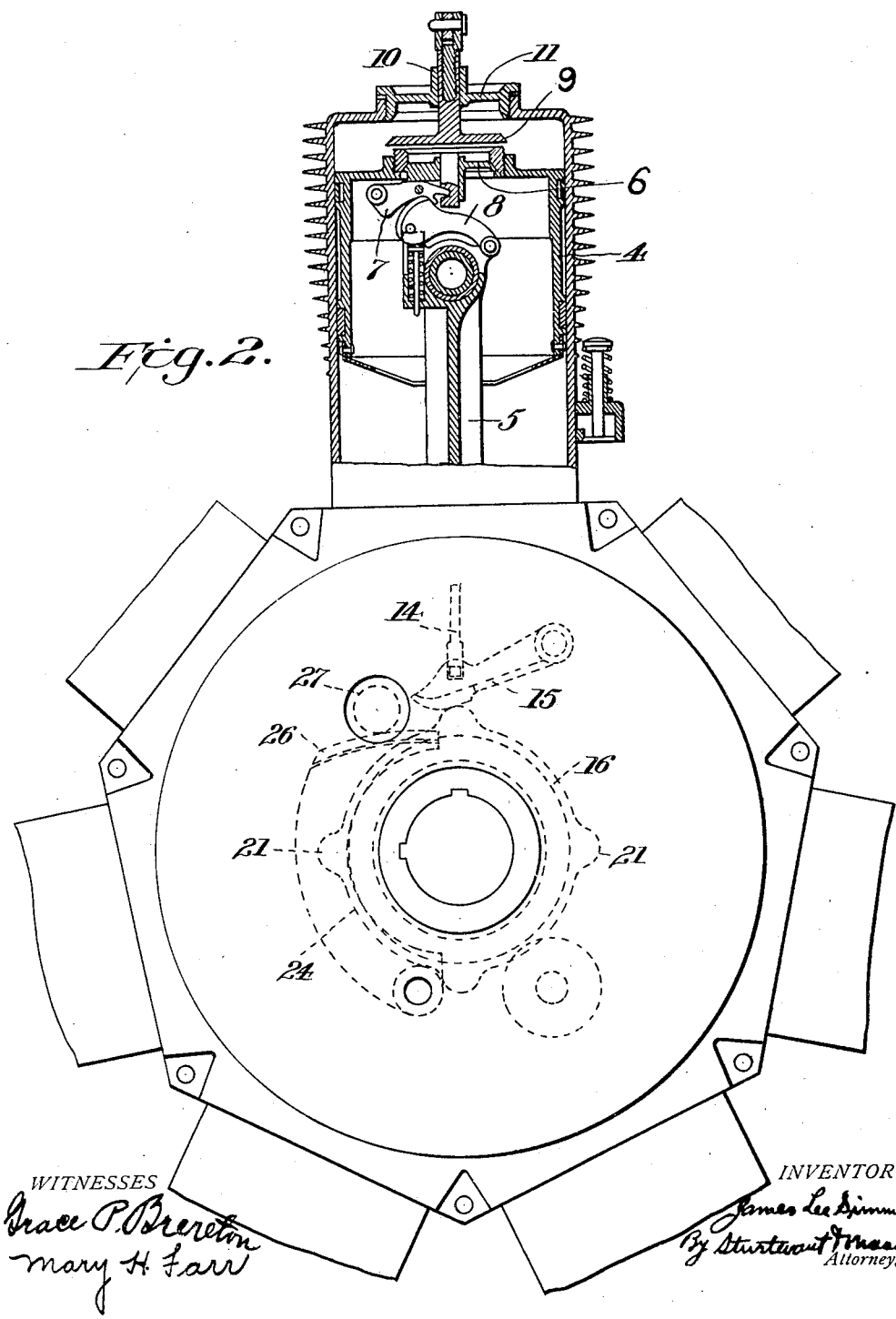

In the drawings which show by way of illustration one embodiment of the invention,—Figure 1 is a side view with parts in section and parts broken away, showing a rotary engine with my improvements applied thereto; Fig. 2 is an end view of the same, also showing parts in section; Fig. 3 is a detail view, showing the cam for controlling the levers which operate the exhaust valves, and the manually-controlled cam operating upon said levers at certain intervals during the compression stroke; Fig. 4 is a side view of the parts shown in Fig. 3, the lever for the exhaust valve being omitted; Fig. 5 is a plan view of the lever for operating one of the exhaust valves; and Fig. 6 is a detail view, showing the lever for operating an exhaust valve, with the rotating cam and stationary controlling cam in section. Fig. 7 is a detail showing the gears for operating the controlling cam.

In the drawings I have shown the invention as applied to a rotary cylinder gas engine, which consists of a casing 1 carrying a plurality of cylinders 2. As herein shown, the casing carries seven cylinders. This casing 1 is mounted to rotate upon fixed bearings, which bearings are connected with a crank shaft 3. In each cylinder is a piston 4, to which is pivotally attached a connecting rod 5. The connecting rod 5 of each cylinder engages suitable ball bearings carried by the crank 3.

In each piston 4 is an opening, which is controlled by an intake valve 6. Said intake valve 6, as herein shown, is provided with a stem sliding in a suitable bearing and a controlling lever 7 engaging with said stem. This controlling lever is operated by a centrifugal member 8, which during the rotation of the cylinder, operates to open the intake valve at the proper time to take in the charge, and also to close the valve to allow the gases in the cylinder to be compressed. This intake valve and its operating mechanism form no part of the present invention, and have been merely referred to as illustrating one form of intake valve, which may be used in connection with my invention.

Each cylinder in the outer end thereof is formed with an opening to allow the discharge of the burnt gases. This opening is controlled by a valve 9. The valve 9 is formed with a stem 10, which slides in suitable bearings carried by a spider support 11, threaded into the outer end of the cylinder.

A lever 12 is pivoted to a bracket 13, carried by the cylinder, and one end of the lever 12 is pivotally connected with the stem 10 of the exhaust valve. The other end of the lever 12 is pivoted to a rod 14.

The rod 14 is pivoted at its inner end to an operating dog or lever 15. This operating lever 15 is mounted so as to travel with the cylinders.

As a means for opening the exhaust valves in the cylinders in the proper timed relation to the rotation of the cylinders, I have provided a cam 16. This cam 16 is connected with a gear 17 free to turn about the supporting shaft for the engine casing. The gear 17 is rotated by a gear 18, which is fixed to a gear 19 which meshes with a gear 20, which is fixed so as to rotate with the cylinders. The gears 18 and 19 are stationary relative to the cylinders and the rotating gear 20 will impart a rotation to the gear 17, which carries the cam 16. These gears are so proportioned in a seven-cylinder rotary engine, as herein shown, that said cam 16 will be rotated four times for seven rotations of the cylinder. By this timing of the operating cam 16, the exhaust valves will be actuated so that alternate cylinders may be fired in the well known manner in this type of engine.

The engine is preferably operated on what is known as the four-cycle principle,—namely, suction or admission of charge; compression of charge; explosion or power stroke; and exhaust.

Starting with the parts in the position shown in Fig. 2, the engine rotates in the direction indicated in the arrow in this figure. The cylinder in section may be considered in the position for firing. Upon the firing of the charge and explosion, the cylinder would be caused to rotate in the direction of the arrow. After the cylinder shown in section has traveled through an arc of 180°, the exhaust valves will be opened, so that during the rotations through the next arc of 180°, the burnt gases may be discharged through the exhaust valve. The rotation through the following arc of 180° is the suction stroke, and as the cylinder shown in the section returns to the position shown in this figure, the compression stroke occurs.

The cam 16 controlling the exhaust valves, is formed with suitable projections 21. These projections are so positioned on the cam 16, as to operate in succession upon the exhaust valves in alternate cylinders, to open the exhaust valves at the intervals above stated.

In order to control the amount of compression and regulate the speed of the engine, especially in the starting of the engine, I have provided means for relieving the compression, or a portion of the compression, during the compression stroke of the cylinders. As herein shown, I relieve the compression in the cylinders by devices operating upon the exhaust valves during the compression stroke, in the respective cylinders. Said devices consist of a non-rotating cam 22, which is pivoted at 23 to a supporting plate 24, which is stationary. This cam 22 is formed with a cam face 24', which is adapted at certain times to coöperate with a projecting part 25 of the lever 15, which controls the exhaust valve in each cylinder.

The pivoted cam 22 is formed with a segmental gear 26, and a pinion 27, which is manually controlled, engages said segmental gear, and may be used to swing the cam 22 about its pivotal support 23, and vary the position thereof relative to the cam 16, which controls the levers attached to the exhaust valves. The cam face 24' is curved on a smaller radius than the concentric portion of the cam 16. This cam 22 may be positioned so as to be entirely out of the path of the levers 15, controlling the exhaust valves. By turning the pinion 27, the cam face 24' may be moved so as to be brought into contact with said levers 15. Inasmuch as this cam face 24' is eccentric and formed on a smaller radius than the cam 16, the time of contact between the levers 15 and the cam face 24' will depend upon the position of the non-rotating cam 22. The greater the distance said cam 22 is moved away from the center of rotation of the engine, the longer will be the time of contact with the levers 15. This cam 22, which is stationary relative to the rotation of the cylinders, is so positioned as to engage the levers 15 during the compression stroke. The cam projections 21 project beyond the extreme position of the cam face 24', so as to operate upon the levers 15 to open the exhaust valves of the cylinders which are discharging the burnt gases, although this time of opening the exhaust valves in these cylinders occurs just in advance of the compression stroke in the alternate adjacent cylinders. In other words, the effective time of the cam 24 on the levers 15 of the cylinders which are compressing the gases, occurs between two projections 21 operating to open the exhaust valves in the cylinders which are exhausting.

It will readily be seen that by shifting the cam 22 toward and from the center of rotation of the engine, that the exhaust valves may be opened momentarily, or held open, thereby preventing the closing of the same, during the early part of the compression stroke; or otherwise manipulated, so as to vary the amount of compression in the cylinders. This varying of the amount of compression in the cylinders is of main value in starting the engine, as it relieves the compression, so that the engine may be readily cranked, and also causes the engine to start up gradually under low compression, which may be increased as the engine speeds up.

While I have shown the invention as applied to a seven-cylinder rotating gas engine, it is obvious that the same is applicable to gas engines having any number of cylinders.

While I have also shown a rotating cam for operating upon the exhaust valve, it will be obvious from certain aspects of the invention, that any suitable devices may be used for operating the exhaust and intake valves, the essential feature of the invention being the manually-controlled devices for relieving the amount of compression in the cylinders at the proper intervals, so that the amount of compression and speed of the engine may be readily controlled through the manual means.

Having thus described my invention, what I claim as new and desire to secure by Letters Patent, is:—

1. A rotary cylinder gas engine, including in combination a casing, a plurality of cylinders carried thereby, intake and exhaust valves for each cylinder, a rotating cam for controlling said exhaust valves to discharge the burnt gases, a non-rotating cam, and manually controlled means for positioning said cam for opening the exhaust valves in turn during compression for regulating the speed of the engine.

2. A rotary cylinder gas engine, including in combination a casing, a plurality of cylinders carried thereby, intake and exhaust valves for each cylinder, a rotating cam for controlling said exhaust valve to discharge the burnt gases, a non-rotating cam, manually controlled means for positioning said cam for opening the exhaust valves in turn during compression for regulating the speed of the engine, said manually controlled means including devices whereby the position of the non-rotating cam may be shifted radially relative to the rotation of the casing, whereby the time that the exhaust valves are held opened may be varied.

3. A rotary cylinder gas engine, including in combination a casing, a plurality of cylinders carried thereby, intake and exhaust valves for each cylinder, a rotary cam for controlling the said exhaust valves to discharge the burnt gases, a member movable radially of the casing, a cam carried thereby and adapted to operate upon the exhaust valves in turn for opening the same, said cam being so disposed as to open said valves during compression, whereby a portion of the gases in the cylinder may be allowed to escape, and manually controlled means for shifting said member radially of the casing.

In testimony whereof I affix my signature, in presence of two witnesses.

JAMES LEE SIMMONS.

Witnesses:
  C. L. STURTEVANT,
  A. M. PARKINS.

Copies of this patent may be obtained for five cents each, by addressing the "Commissioner of Patents, Washington, D. C."